W. J. KENT.
RUBBER OR ELASTIC VEHICLE TIRE.
APPLICATION FILED DEC. 29, 1914.

1,302,173.

Patented Apr. 29, 1919.

Witnesses:
Edw. W. Vaill
B. V. Mohan

Inventor
William J. Kent,
By his Attorney
Ernest Hopkinson

UNITED STATES PATENT OFFICE.

WILLIAM J. KENT, OF BROOKLYN, NEW YORK, ASSIGNOR TO REVERE RUBBER COMPANY, A CORPORATION OF RHODE ISLAND.

RUBBER OR ELASTIC VEHICLE TIRE.

1,302,173.

Specification of Letters Patent.     Patented Apr. 29, 1919.

Application filed December 29, 1914. Serial No. 879,459.

*To all whom it may concern:*

Be it known that I, WILLIAM J. KENT, a citizen of the United States, residing in the borough of Brooklyn, city of New York, county of Kings, and State of New York, have invented a certain new and useful Improvement in Rubber or Elastic Vehicle-Tires, of which the following is a full, clear, and exact disclosure.

My invention relates to that class of rubber or elastic vehicle tires in which the elastic portion is vulcanized or secured to a metallic base plate, particularly to those tires known as solid or block tires to be used in connection with heavy vehicles. The object of my invention is to produce a rubber or elastic vehicle tire in which the blocks or sections thereof are securely fastened to the base plate so that the same will not become separated under great stresses to which such tires are subjected.

For a detailed description of a preferred form of my invention, reference may be had to the following specification and to the accompanying drawing forming a part thereof, in which.

Figure 1:
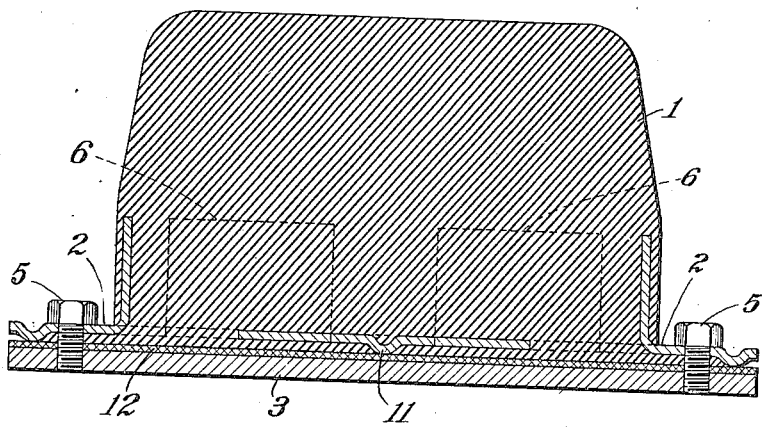
Figure 1 is a transverse sectional view taken substantially upon the line A—A, Fig. 2, but showing in addition the rubber block in position thereon.
Figure 2:
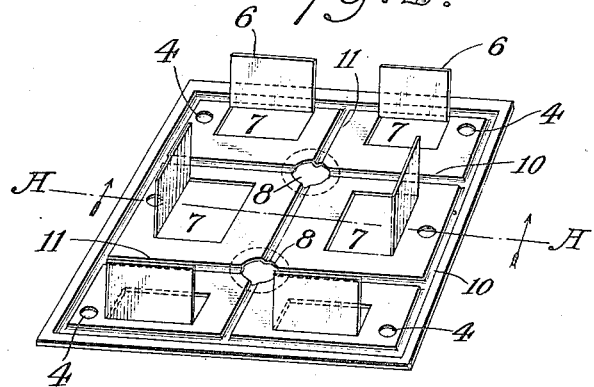
Fig. 2 is a perspective view of the base or anchoring plate showing the projection thereon for more securely holding the rubber in position.
Figure 3:
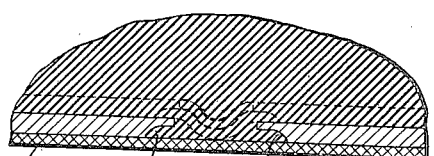
Fig. 3 is an enlarged sectional view of the lower central portion of Fig. 1.

Referring to the drawing, the numeral 1 indicates a block of rubber, of the usual rubber composition for such purposes, which is vulcanized to a base plate 2 adapted to be secured to the felly band 3 of a vehicle wheel. This base plate 2 may be attached to the felly band or to the felly of a vehicle wheel in any suitable way, but for convenience I have shown the margin of the plate 2 provided with a series of holes 4 through which the screws or bolts 5 may pass which are in turn screw-threaded into the felly band 3. The base plate 2 is preferably made of sheet metal and is provided with a series of turned-up ears or projections 6 so arranged as to form a substantially rectangular inclosure within the margin of said base plate. These turned-up ears leave openings 7 through which the rubber of the tire may project, hereinafter to be more fully described. The central portion of the base plate 2 is also provided with a plurality of openings, such as 8, through which the rubber may project, and the underside of the plate is cut away or countersunk as indicated at 9 in Fig. 3. The base plate 2 is also provided with a series of marginal grooves 10 which form ridges or beads on the underside thereof and with transverse and longitudinal grooves 11, which intersect the grooves 10 and the holes 8 and also form beads on the underside of the base plate 2. The numeral 12 indicates a piece of heavily frictioned fabric which is placed on the base plate 2 so that the rubber which passes through the openings 7 and 8 will come in contact therewith during the process of vulcanization. The method of uniting the rubber block and the base plate 2 is as follows:

The rubber composition is placed in a suitably shaped mold and the base plate 2 is placed on one side thereof with the ears 6 projecting into the mold. The piece of heavily frictioned fabric is placed on the outside of the plate 2. The mold is then closed by a suitable cover under pressure and the parts so assembled are then placed in the vulcanizer and vulcanized or cured.

Before being placed in the mold, the plate 2 is suitably treated so as to remove all the dirt and grease from the surface thereof and to clean the same so as to expose the pure metal to contact with the rubber.

The construction above described results in a tire or tire block in which the rubber is very firmly united to the base plate, and obviates all danger of the parts being separated during use on a vehicle wheel.

The under cut holes 8 and the openings 7 allow the rubber to flow through the same and firmly unite with the frictioned fabric, the undercut portions forming integral anchorages which add greatly to the unity of the connection. The beads formed by the grooves 10 and 11 separate the base plate 2 slightly from the frictioned fabric 12 and the felly band 3 thereby providing definite bearing points and allowing the rubber to flow into and fill the spaces between the beads, thus improving the unity of the connection between the rubber and the metal.

The fact that frictioned fabric is placed upon the inner surface of the base plate, provides a lining producing a frictional engagement between said base plate and the felly band, thereby effecting a solid, non-slipping joint between said parts and preventing the entry of dirt, water, and other foreign matter.

Having thus described my invention, what I claim and desire to protect by Letters Patent is:

1. In combination with a metallic base member having a plurality of openings therein, a rubber body portion vulcanized to one side thereof and extending through said openings, and pockets formed in the side opposite the said body portion and communicating with said openings to form heads of rubber extending laterally of the openings.

2. In an elastic vehicle tire, a base member of sheet metal having laterally projecting tongues stamped therefrom in angular relationship and a series of pockets formed in the side opposite said tongues, and a body portion of elastic rubber composition vulcanized around said tongues so that the rubber extends through the openings produced by the formation of said tongues and also into said pockets.

Signed at New York, county of New York, and State of New York, this 21st day of December, 1914.

WILLIAM J. KENT.

Witnesses:
 FRANCIS BOYLE,
 EDWARD W. VAUT.